United States Patent [19]
Fehrenkamp

[11] 4,180,838
[45] Dec. 25, 1979

[54] METHOD AND APPARATUS FOR PRODUCING PROGRAMMABLE SELECTION OF MUSIC

[76] Inventor: William Fehrenkamp, 8826 Bissonnet, Houston, Tex. 77074

[21] Appl. No.: 894,920

[22] Filed: Apr. 10, 1978

Related U.S. Application Data

[63] Continuation-in-part of Ser. No. 866,779, Jan. 3, 1978, abandoned.

[51] Int. Cl.[2] .............................................. G11B 15/12

[52] U.S. Cl. ............................ 360/63; 179/100.1 PS; 360/72.1

[58] Field of Search ....................... 360/63, 64, 61, 91, 360/92, 72, 78, 12; 179/100.1 R, 100.1 VC, 100.1 C, 100.1 PS

[56] References Cited

U.S. PATENT DOCUMENTS

| | | | |
|---|---|---|---|
| 2,969,525 | 1/1961 | Hill | 360/63 X |
| 3,051,777 | 8/1962 | Lemelson | 360/72 X |
| 3,291,919 | 12/1966 | Robitaille | 179/100.1 PS X |
| 3,365,702 | 1/1968 | Heatwole | 360/72 |
| 3,911,487 | 10/1975 | Ladriere | 360/63 |
| 4,003,089 | 1/1977 | Maurer | 360/63 |
| 4,014,039 | 3/1977 | Yasunaga | 179/100.1 VC X |
| 4,054,926 | 10/1977 | Haynes | 360/72 |

FOREIGN PATENT DOCUMENTS

| | | | |
|---|---|---|---|
| 831,459 | 3/1960 | United Kingdom | 179/100.1 PS |

*Primary Examiner*—John H. Wolff
*Attorney, Agent, or Firm*—Bill B. Berryhill

[57] ABSTRACT

A prerecorded magnetic tape format having program breakpoint alignment is used in the present invention to provide continuous long duration, highly non-repetitive, program selectable selections of music as for use in background music systems. Cueing means are provided at the end of each set of recorded musical selections of a multi-channel playback system. The cueing signal is used to trigger a programmable channel selection means for controlling which channel of the multi-channel system is selected for reproducing the next recorded musical selection. This program breakpoint switching process is repeated for any desired playing interval.

14 Claims, 6 Drawing Figures

METHOD AND APPARATUS FOR PRODUCING PROGRAMMABLE SELECTION OF MUSIC

CROSS-REFERENCE TO RELATED APPLICATION

This application is a continuation-in-part of application Ser. No. 866,779, filed Jan. 3, 1978, now abandoned.

BACKGROUND OF THE INVENTION

1. Field of the Invention

This invention relates to record media and tape playing systems and more particularly to such systems for providing continuous sources of music with each musical selection appearing from time to time in an apparently random or programmable fashion.

2. Description of the Prior Art

It has become commonplace in our present society to provide pleasant background music in retail stores, offices and work areas such as industrial facilities. It has been found that the provision of such pleasant music has a psychological effect on those present which leads to greater inclination for purchases, higher productivity and more relaxed or informal atmosphere. Several sources of background music are commonly available at the present time. Each of these sources has advantages and disadvantages.

Perhaps the least expensive music source is a conventional FM radio receiver tuned in to a commercial FM broadcast station. This provides background music, but it is interrupted with commercials, promotional announcements, news, weather, sports, and the like. These interruptions require the concentration of the casual listener and thus detract from the atmosphere of the music providing a pleasant background.

Another source of background music is a conventional automatic change record player and a stack of record albums. Such systems have commonly been employed in small offices, but require an employee to change the record stack at periodic intervals. This music source generally can become a nuisance to operate. Similarly, another source of background music, such as a conventional eight track tape playing apparatus can be used in a similar fashion and will play continuously on a particular eight track cartridge. However, such systems require frequent changing of the tape cartridges in order to avoid repetition of the same musical selections. Also, such eight track cartridges generally employ the same artist throughout a given album tape for recording of the music. The recordings are played sequentially as they appear on the tape in a predictable fashion. This leads to frequent repetition of the same numbers which rapidly becomes discernable to even the casual listener.

A popular alternative to these methods of providing background music has been the use of the Subsidiary Communications Authorization channel of a commercial FM station. This subsidiary communications channel is transmitted by the FM station along with their regular programming, but on a subcarrier frequency which is offset from the main program channel. The music carried on the sub-channel is separate and different from the regular programming and usually contains no commercials. The reception of such subcarrier communications requires a special detecting system which is supplied by the commercial FM station under a franchise arrangement. This feature has been highly successful. Different environments, however, often require different types of background music. Background music suitable for use in a restaurant, for example, may not be of the type desired by a factory employing production line workers. A multiplicity of franchising arrangements has been necessary to secure the type of service desired by a variety of clientele because an FM stereo station is limited to a single SCA channel.

Cable television systems, which are available in many communities, also usually provide one or more sources of background music. In fact, ten or more different types of music have been supplied on some cable systems which are selectable merely by the attachment of a conventional FM receiver to the cable television outlet of a consumer.

In spite of the commerical success of FM subcarrier channels and cable television distributing systems, many users still prefer to provide their own music source and usually resort to hard wired distribution systems employing a central tape playing facility and speakers located at the points of usage. Such systems require maintenance, attendance and, generally, can become burdensome to the operator while not providing a broad base of programming material in a highly non-repetitive order.

The tape playing system of the present invention is suitable for individual users or distribution centers such as cable television systems or FM subcarrier auxiliary channel stations themselves. The system of the present invention provides a relatively inexpensive and vastly versatile reproduction or playing system which can provide a seemingly infinite variety of musical selections in an apparently random fashion without repetition for great lengths of time. The system can be based on the economical ¼-inch eight track tape configuration and can be utilized with open reel, cassette, endless loop, or cartridge type tape transports. Highly non-repetitive and apparently random selection of different songs may thus be provided by a single transport at a reasonable expense and without the necessity of periodic changes of program material by an operator. Similarly, if desired, a system according to the present invention can provide predetermined patterns of selections which may be selected under program control.

BRIEF DESCRIPTION OF THE INVENTION

The tape reproduction system of the present invention utilizes a particular tape format recorded on a ¼-inch eight track tape and having musical selections of approximately the same playing time recorded adjacent each other along the tape for various time duration intervals. In one embodiment a selection ending detection circuit detects the end of the play of a previous selection and is used to gate an apparently random number generator which generates a random number between zero and seven. This apparently random number is used to select the next channel of the eight track tape for playing a successive musical selection. Alternatively, various cueing schemes can be utilized to signal the end of each set of selections and to control the gating of the apparently random number generator used to generate the next channel selection. Similarly, in another embodiment, the cueing signal may be used to index a counter circuit used to select the next selection to be played from a preprogrammed memory device.

In an endless loop tape playing system, the silence detector or cueing detector suffices to control the playing of subsequent selections. In an open reel, cassette or cartridge system, conventional cueing means can be utilized at the ends of the tape to cause reversal or rewind function to occur in a conventional manner. Thus, one embodiment of the invention to be described in detail subsequently, will be discussed in terms of a National Association of Broadcasters (NAB) endless loop tape playing system. However, it will be understood that the concepts of the present invention are not limited to such a system, but can also be employed with cartridge, cassette or open reel system. A second embodiment to be described in a programmable selection system is discussed in terms of an open reel tape transport.

The invention may best be understood by reference to the following detailed description thereof when taken in conjunction with the accompanying drawings, in which:

DESCRIPTION OF THE PREFERRED EMBODIMENTS

The description of one preferred embodiment of the present invention will be discussed with respect to a tape reproduction system utilizing a NAB endless loop cartridge transport. However, it will be understood by those skilled in the art that the system of the present invention is not confined to this type of tape transport. Any multichannel sound reproduction device may be used with varying degrees of utility. More, or less, than eight channels can also be used if desired.

For example, the present system of apparently random musical selection could be applied to a multiple channel optical sound reproduction system, if desired, without departing from the concepts of the invention. Similarly, the eight channels of the tape system to be described in more detail subsequently, could themselves comprise up to fifty sub-channels of multiplexed musical arrangements with only the addition of a demultiplexer unit being attached to the reproduction device being needed to provide this additional versatility to the system. The inventive concepts of the present system may also be applied to audio selections recorded in multiplexed form on record media such as video discs or video tapes without departing from the true spirit and scope of the invention. The video disc and video tape are especially adaptable to a fifty or more channel system where all channels are multiplexed on a single recording track. Stereophonic and quadraphonic versions of the invention become more practical with such arrangements. For the sake of simplicity, the inventive concepts will be described with respect to a playback system utilizing a conventional eight track ¼-inch magnetic tape, however, the applicability of these concepts to these other types of systems should be kept in mind in reading the following descriptions and claims.

Figure 1:
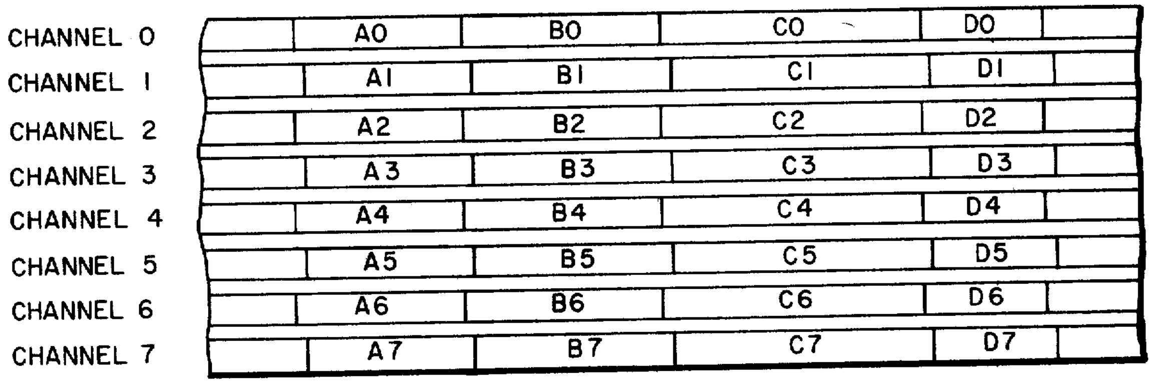
FIG. 1 is a schematic drawing illustrating the tape format used on an endless loop eight track tape in the present invention.
Figure 2:
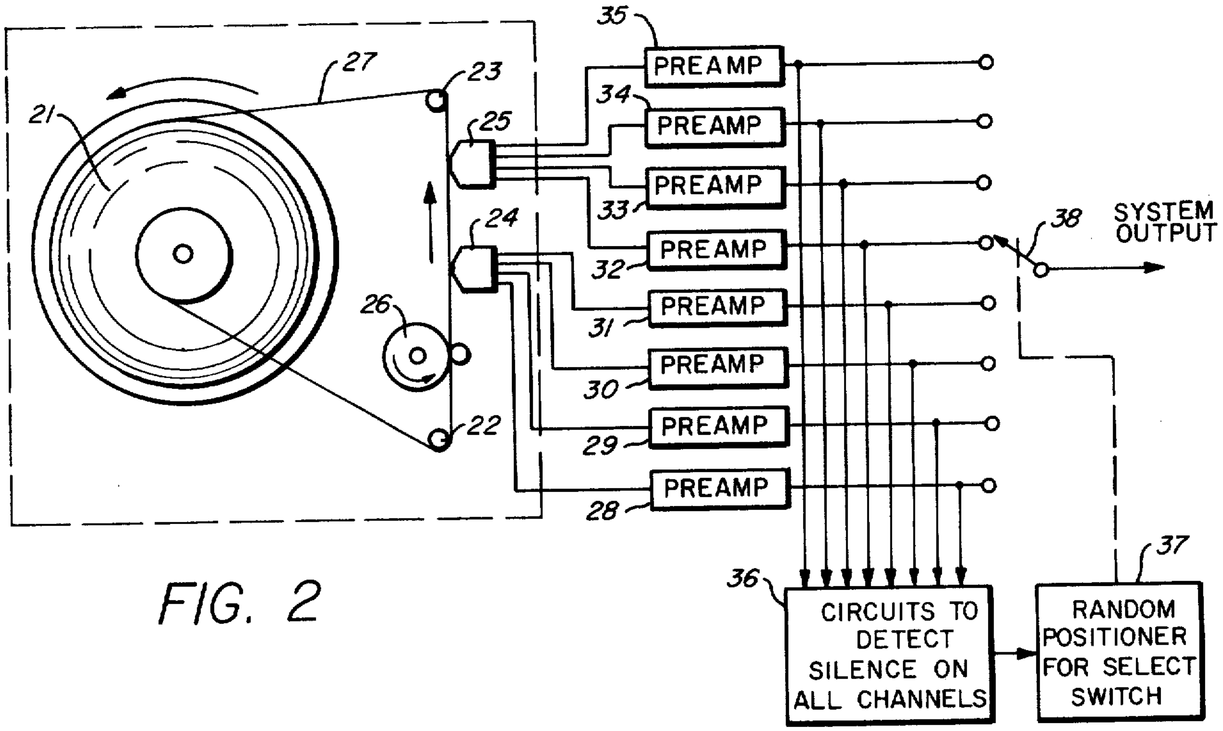
FIG. 2 is a schematic block diagram of a tape reproduction system according to the present invention and illustrating the principles of the invention.

Referring initially to FIGS. 1 and 2, it will be observed that the endless loop of a tape 27 carried by a reel 21 is driven by a pinch roller and capstan arrangement 26 and guided by pins 22 and 23 past two tape reproduction heads 24 and 25. The tape heads 24 and 25 are positioned to allow simultaneous reproduction from all eight channels in the eight track format. FIG. 1 shows the eight track tape format, as well as illustrating the special positioning of the musical selections used in the operation of the system according to the invention.

The eight tracks of the tape section illustrated in FIG. 1 are labeled Channel 0 through Channel 7. Musical selections recorded lengthwise along the tape section of FIG. 1 are labeled A0, B0, C0, D0, etc., in Channel 0. Similarly, the other channels have musical selections labeled A, B, C, D, etc. positioned lengthwise in each of the channels. It will be observed in FIG. 1 that the selections labeled A in each of the eight channels are staggered in alternate channels to allow for the difference in positioning of the tape heads 24 and 25 employed to reproduce the recorded material. The heads 24 and 25 must necessarily be spaced a slight distance apart. Thus, channels 0, 2, 4, and 6 are detected for playing by one tape head; while channels 1, 3, 5, and 7 are detected by the other tape head. It will be understood, however, that if a single movable playback head, similar or identical to the arrangement common in the conventional eight track cartridge tape playing apparatus is used, that such staggering in alternate channels would not be required, since only a single playback head is involved. The use of the movable head can reduce the effectiveness of the channel silence cue described hereafter and may require the use of other cue methods if a minimum length silence period between songs is desired. Single heads with 3, 4, 8, 12, and 16 channels employing various widths of tape are commonly available and if a single fixed head arrangement were used for all channels reproducing simultaneously, then no stagger of the channels would be required for this arrangement either.

It will be observed in FIG. 1 that the musical selections A0, A1, A2, A3, A4, A5, A6 and A7 are recorded for a time duration which is approximately equal and are thus of equal longitudinal length along the tape. The content of each of these selections may be of any type which is desired; however, the length of play of each of the selections should be approximately the same for use in the context of the present invention. Similarly, it will be observed that the length of play of selections B0 through B7 are also approximately of the same duration, although it should be noted that these selections need not be of the same duration as selections A0 through A7. In fact, the length of play of selections along the length of any track may be any duration desired. However, those selections recorded in the corresponding longitudinal intervals of the adjacent channels should all be of the same length of play for best operation of the present invention. This duration of play requirement is not absolute, however, as silent intervals at the beginning or end of each selection may be employed to cause approximately the same duration or time of reproduction of corresponding longitudinal segments for each channel. Thus, the musical selections on corresponding longitudinal segments should be approximately the same length of reproduction or playing time. This arrangement of the selections may be referred to as having program breakpoint alignment.

Referring again to FIG. 2, output signals from the tape reproduction heads 24 and 25 are conducted to a plurality of (eight) preamplifiers 28, 29, 30, 31, 32, 33, 34 and 35, where the initial low-level signals are amplified to a higher level suitable for further amplification and provision to a system output (not shown) such as a speaker, radio transmitter or a cable-driving circuit. The outputs of each of the preamplifiers 28 through 35 are sampled by a silence detector circuit 36 which will be discussed in more detail subsequently. The silence detection circuit 36 functions to detect the end of the playing of a previous selection on one of the eight channels of the system. This is accomplished by detecting a silent interval at the end of play of the current selection on all eight channels. When the silence detection circuit 36 detects a silence of suitable duration on all channels, the end of the playing of a previous selection is complete. At this time, the silence detecting circuit 36 provides an output signal to a random positioner 37. The random positioner circuit 37, which will be discussed in more detail subsequently, provides a random or apparently random numaber which generates the selection of the next channel to be output from the system. The random position selection generator is illustrated in FIG. 2 as a mechanical selection switch 38. However, it will be appreciated by those skilled in the art that an all electronic switching means can be used and will be described subsequently with respect to the other figures. Upon the generation of the random positioning signal by the circuit 37, the selector switch 38 is engaged with the output of one of the preamplifiers (28 through 35) according to the signal generated by the random position selection circuit 37. Thus, the next selection which is played is determined by the signal generated by the random position selection circuit 37 and is provided to the system output. The other channels of the eight channel reproduction system are muted during this playing time interval. This type of channel switching arrangement may be referred to as program breakpoint channel switching. Such switching can be used in any type of reproduction media having program breakpoint alignment.

Referring again to FIG. 1, an apparently random sequence of the recorded selections on the tape format illustrated is selected by the random positioning selection circuit 37. For example, during the first interval, channel 1 may be selected. At the end of the playing time of the selection A1, the silence detecting circuit 36 conditions the random positioning selection circuit 37 to generate an apparently random number between 0 and 7, inclusive. This number determines which one of the selections B0 through B7 is selected for output from the system subsequently to the previous selection A1. At the end of play of this selection B0–B7, the process is repeated and one of the selections C0 through C7 of FIG. 1 is selected and played. Since a NAB endless loop tape is illustrated in FIG. 2, this process is merely repeated at the end of the play time of each selection. An apparently endless variety of background music is supplied by the system, the selection of each number being determined at the end of the playing time of the previous number by the random positioning selection circuit 37.

Figure 3:
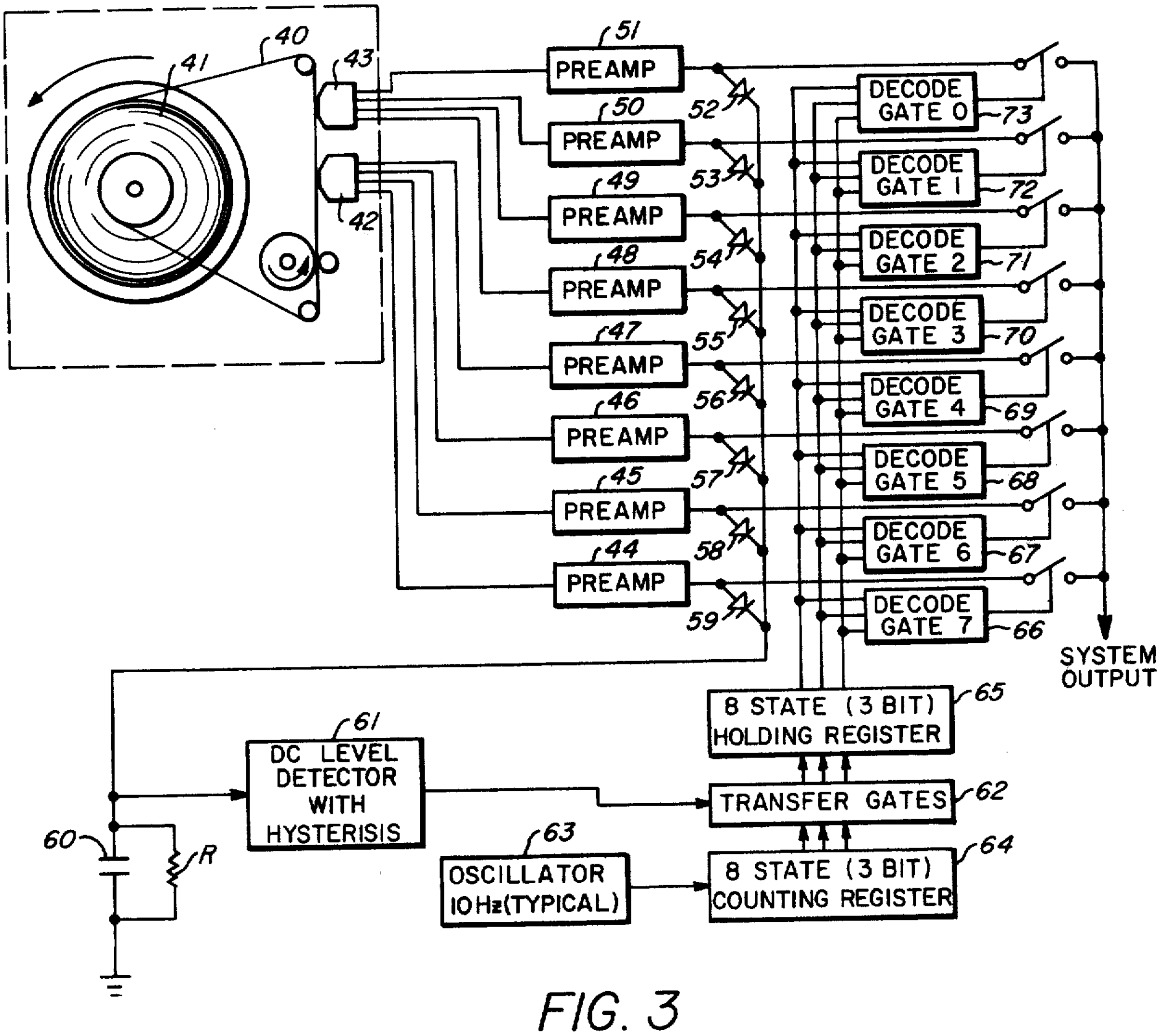
FIG. 3 is a schematic block diagram illustrating in more detail a tape reproduction system in accordance with the concepts of the present invention and illustrating electronic circuitry associated therewith.

Referring now to FIG. 3, a system analogous to the principles of operation of that illustrated in FIG 2 is shown with the electronic circuitry utilized illustrated in somewhat more detail. A NAB endless loop tape cartridge 41 provides motion to a tape 40, past two tape heads 42 and 43 in the manner previously discussed. Preamplifiers 44 through 51 are associated with each of the eight channels and are connected to the outputs of the tape heads 42 and 43. A sample of the output of each of the preamplifiers 44 through 51 are provided via diodes 52, 53, 54, 55, 56, 57, 58 and 59. As long as music is present on any of the eight channels, current will be supplied via diodes 52 through 59 to a capacitor 60. When the music ceases on all eight channels, as will occur when the music is recorded according to the tape format of FIG. 1, the capacitor 60 discharges through a high resistance load resistor R to a lower potential. A DC level detection circuit 61 senses the charge level stored on capacitor 60 and when this has declined to a predetermined level, which may be set as desired, the DC level detector circuit 61 provides an output signal to a plurality of transfer gates 62. The transfer gates 62 may be part of, for example, type D flip-flops having a transition sensitive clock (not shown).

While the musical selections are playing on each of the eight channels, an oscillator circuit 63 is counted into a three bit (or eight state) counting register 64. As long as the oscillator runs at a high speed relative to the length of play time of the selections on the tape, the number contained in the three bit counting register 64 at the cessation of playing of a selection on one of the eight channels will be apparently random. When the DC level detector circuit 61 provides a conditioning signal to the transfer gates 62, the contents of the counting register 64 are transferred via transfer gates 62 to a three bit holding register 65 where they remain until the occurrence of another output signal from the DC level detector circuit 61. The contents of the holding register 65 are supplied to each of eight decoding gates 66, 67, 68, 69, 70, 71, 72, and 73. Each of the decoding gates 66 through 73 is conditioned to close an associated electronic switch of conventional type, and provide an output signal to the system output line only upon the occurrence of a preset code number representative thereof being provided to its inputs. Thus, the number in the eight-state holding register 65 determines which one of the eight decoding gates 66 through 73 is activated and which corresponding switch is closed for the selection of the next musical selection to be played from the endless tape loop. The remaining seven channels are not conducted to the system output line during the play time of the next selection. The process is thus repeated at the end of each musical selection recorded according to the tape format of FIG. 1.

Figure 4:
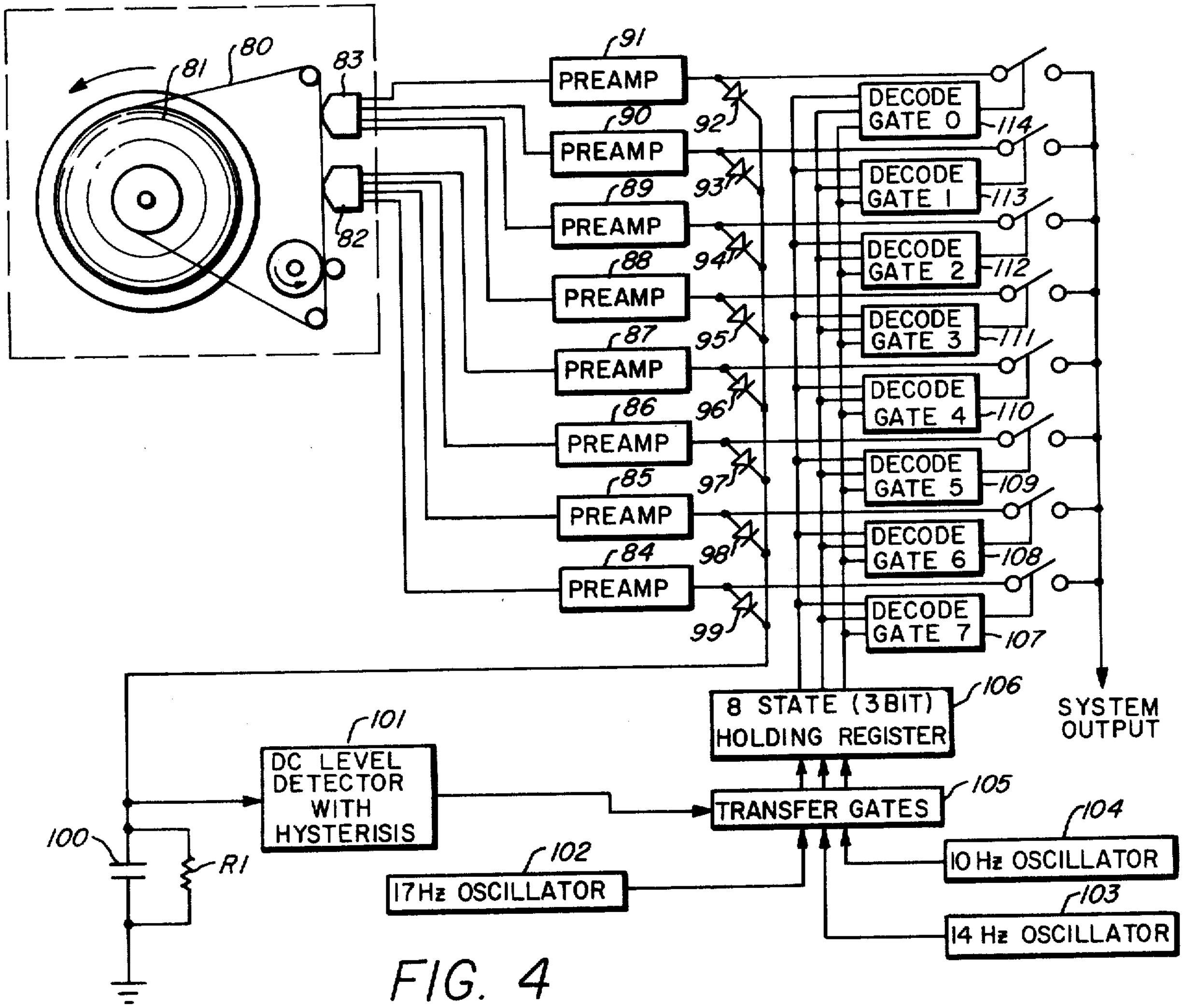
FIG. 4 is a schematic block diagram illustrating another embodiment of a tape playing system in accordance with the concepts of the present invention.

Referring now to FIG. 4, yet another embodiment of the system according to the concepts of the present invention is illustrated. Again, a NAB endless loop tape cartridge 81 provides tape 80 motion past tape heads 82 and 83. The output signals of tape heads 82 and 83 are conducted to eight preamplifiers 84 through 91 as previously described. The outputs of the preamplifiers 84 through 91 are sampled via diodes 92 through 99 and used to charge a capacitor 100. Upon the occurrence of silence at the end of the selection in each of the eight channels, the capacitor 100 discharges through a load resistor $R_1$. A DC level detector circuit 101 detects the fall of voltage on capacitor 100 when it falls below a predetermined level. An output signal is provided at this time from the DC level detector 101 to transfer gates 105. In the embodiment shown in FIG. 4, each of the three transfer gates 105 is driven by a separate oscillator 102, 103, or 104.

The oscillator 102 oscillates at a frequency of approximately 17 hertz; the oscillator 103 oscillates at a frequency of approximately 14 hertz; and the oscillator 104 oscillates at a frequency of approximately 10 hertz. Thus, each of the three transfer gates 105 is driven at a different rate which is very short compared with the play time of a given selection on the tape recorded according to the format of FIG. 1. Upon the occurrence of an output signal from the DC level detector 101, the transfer gates 105 are conditioned to pass bits (binary digits) representative of a binary number between zero and seven inclusive, which is representative of the state of the three driving oscillators 102 to 104 at that time. This binary number is supplied via the transfer gates 105 to a three bit holding register 106 in a manner analogous to that discussed with respect to the embodiment of FIG. 3. These transfer gates may be part of the type D flip-flops previously described with respect to FIG. 3.

Thus, an apparently random binary number between zero and seven is supplied to the eight state (or three bit) holding register 106. This number is used to condition the decode gates 107, 108, 109, 110, 111, 112, 113 and 114, in a manner analogous to that illustrated with respect to FIG. 3. Thus, one of the decode gates 107 through 114 is conditioned to close the associated switch and conduct the output of its corresponding preamplifier to the system output line dependent on the states of the three oscillators 102, 103, 104, at the instant the DC level detector 101 output signal transition is provided to the transfer gates 105. In this manner, an apparently random integer number between zero and seven is generated which causes the selection of the corresponding track on the prerecorded tape for the next play time interval.

While two different methods of generating the apparently random number used to select the next selection along the prerecorded eight track tape have been illustrated, it will be apparent to those skilled in the art that any number of variations of this technique may be utilized. For example, a counting register could be connected directly to the decode gates. This counting register could be driven by a very high frequency (such as 1 megahertz) oscillator during a portion of the silent period at the end of each selection. The portion of this silent period used for the counting purpose could be determined by a monostable multivibrator having a relatively long duration duty cycle with respect to the frequency of the oscillator. Then, slight variations in the duty cycle of the monostable multivibrator will ensure an apparently random number remaining in the counting register at the end of the counting or duty cycle of the multivibrator.

Another alternative technique would be to use a slow speed oscillator (such as 1 kilohertz) which is gated on and off by a second oscillator operating at an even slower speed (approximately 30 hertz) in place of the very high frequency oscillator. As long as the second oscillator turns the first oscillator off and on many times during a duty cycle and the oscillators are not synchronous, an apparently random number would remain in the counting register at the end of the monostable duty cycle.

Similarly, the silence detector could be replaced by another type of cue detector, if desired, such as an optical cue detector, conductive foil cue detector, inaudible tone cue detector, or a cue track detector of conventional type placed on the tape at the interval between each of the musical selections.

While the previously discussed embodiments have shown systems for apparently randomly selecting musical selections from a prerecorded record medium, it will be appreciated by those skilled in the art that in some applications, it may be desired to have a predetermined sequence of musical selections. In such a system, the selections would be played in a controlled, predetermined sequence and utilizing the concepts of the present invention, such a system having great versatility and user programmable selection can be provided.

Figure 5:
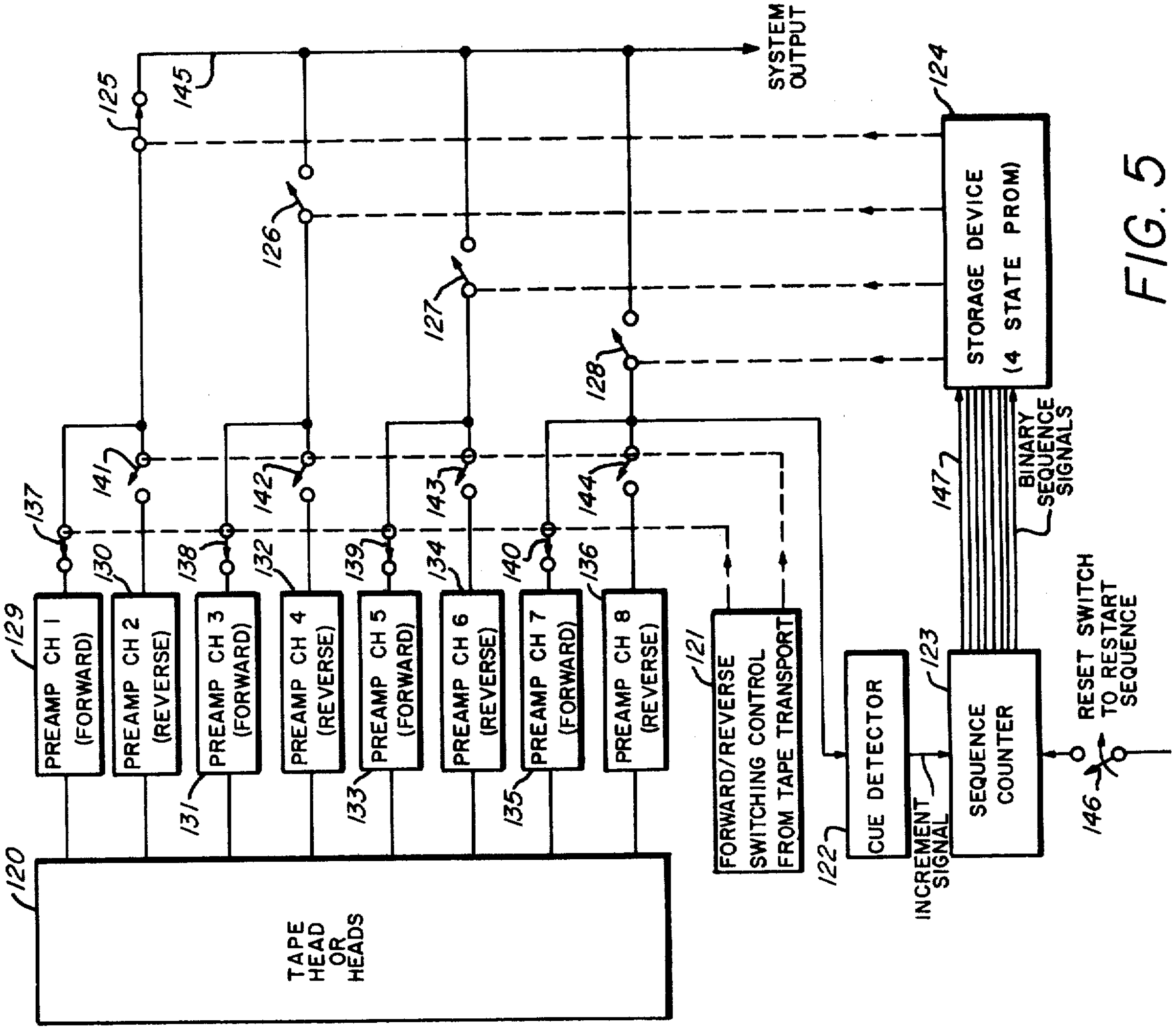
FIG. 5 is a system block diagram of a tape reproduction system employing a programmable selection means.

Referring now to FIG. 5, a programmable musical selection reproducing system is shown in accordance with the concepts of the present invention. In the block diagram of FIG. 5, it will be understood that the record medium employed is magnetic tape and that a reel to reel or open reel type tape transport is contemplated for use in this system. Such open reel system can be bidirectional in nature and can have, for example, eight or more tape channels in their configuration with four or more channels reproducing in each direction of the tape motion. An end of reel sensing system is used at either end of the prerecorded tape which is sensed by a mechanism in the tape transport and used to reverse the direction of motion of the tape reels and therefore the tape motion across the tape reproduction or playing heads.

In a system such as that illustrated in FIG. 5, it will be understood that a similar tape format to that discussed previously with respect to FIG. 1 and having program breakpoint alignment is utilized. Program breakpoint alignment is required only on four of the eight channels, rather than all eight as is shown in FIG. 1. The remaining four channels are used in the other direction and also have program breakpoint alignment but have no alignment relationship (except at the beginning and end of the tape) to the alternate four since they are not used simultaneously. When the tape is mounted on the reel to reel transport (not shown) contemplated for use in the system of FIG. 5, the forward/reverse switching control mechanism 121 is manually placed in the forward or suitable direction and a reset switch 146 is operated to reset a binary sequence counter 123 to a desired starting content. When the forward/reverse switching control component 121 is placed in the forward direction, switches 137, 138, 139 and 140 are placed in the closed position as illustrated in FIG. 5. This selects one set of channel preamplifiers 129, 131, 133 and 135 for playing selections recorded on the tape in tape channels 1, 3, 5 and 7 for use while the tape is moving across tape heads 120 in the forward direction. Conventional circuit and switching means such as foil strips are used to sense the end of the reel of tape in a conventional manner and to cause the forward/reverse switching control mechanism 121 to open switches 137, 138, 139 and 140 and close switches 141, 142, 143, and 144 to select the alternate channels 130, 132, 134 and 136 for playing selections occurring during the reverse or opposite direction of tape motion in the reel to reel tape transport system contemplated for use with FIG. 5.

Upon initiation of the reset switch 146, the binary sequence counter 123 is set to an initial value, for example, zero. The binary sequence counter 123 is an eight bit (or binary digit) counter having eight binary sequence output lines 147, as indicated in FIG. 5. The number contained in the sequence counter 123 at any time is used to index, via the binary sequence output lines 147, the contents of a memory or storage device 124 containing predetermined bit patterns. The contents of the memory locations in the storage device 124 are used to control a plurality of output selection switches 125, 126, 127 and 128. As there are four output selection switches 125–128, a memory device having four states (represented by two or more binary digits) would be sufficient to control the selection of an appropriate output switch 125, 126, 127, or 128. The storage device or memory 124 may thus comprise a programmable read only memory (PROM) having, for example, two-hundred fifty six words indexable by the eight-bit output of the sequence counter 123 and each word being two or more binary digits or bits in length.

It will be recalled from the discussion of the tape format of FIG. 1 that at the end of each musical selection a cue signal is recorded. This may be a silence period or could be an inaudible tone, optical signal or some other cueing signal as desired. Assuming that the forward direction has been chosen as illustrated in FIG. 5, and the tape transport has initiated motion of the tape across the reproducing head, then switches 137, 138, 139 and 140 are in the closed position as shown. The initial contents of the sequence counter 123 will then determine the memory location in the memory storage device 124 which is addressed.

Assume for example that the initially indexed memory location of the storage device 124 contains a binary number which causes the closing of switch 125 as illustrated in FIG. 5. This condition would correspond to the output of tape channel 1 or preamplifier 129 being conducted to a system output line 145 via closed switches 137 and 125. The remaining channels are muted during this operation. When the cueing signal at the end of the first musical selection recorded in the forward direction of tape motion is detected by a cue detector 122, an increment signal is provided from the cue detector 122 to the sequence counter 123 causing an incrementation of the count in the sequence counter 123. When this occurs, a different binary number appears in the sequence counter 123 and indexes a different memory location in the memory or storage device 124 via lines 147. This would cause a different bit pattern to appear on the output lines of the memory or storage device 124, thus selecting a different (possibly) switch system output switch 125, 126, 127 or 128 to be selected for providing the musical output on the system output line 145.

It should be noted that the system output is thus entirely controlled by the contents of the memory or storage device 124 memory locations. Thus, any one of the system output switches 125 through 128 can be closed by control of the contents of a particular memory location in the storage device 124 as desired in a predetermined or programmable manner.

The above sequence of operations is then repeated for as long as the tape is moving in the forward direction (or the reverse direction) as determined by the forward/reverse switching control component of the system 121. Any desired sequence of channel selection may be placed in the pattern stored in the PROM 124 as the user may desire.

Figure 6:
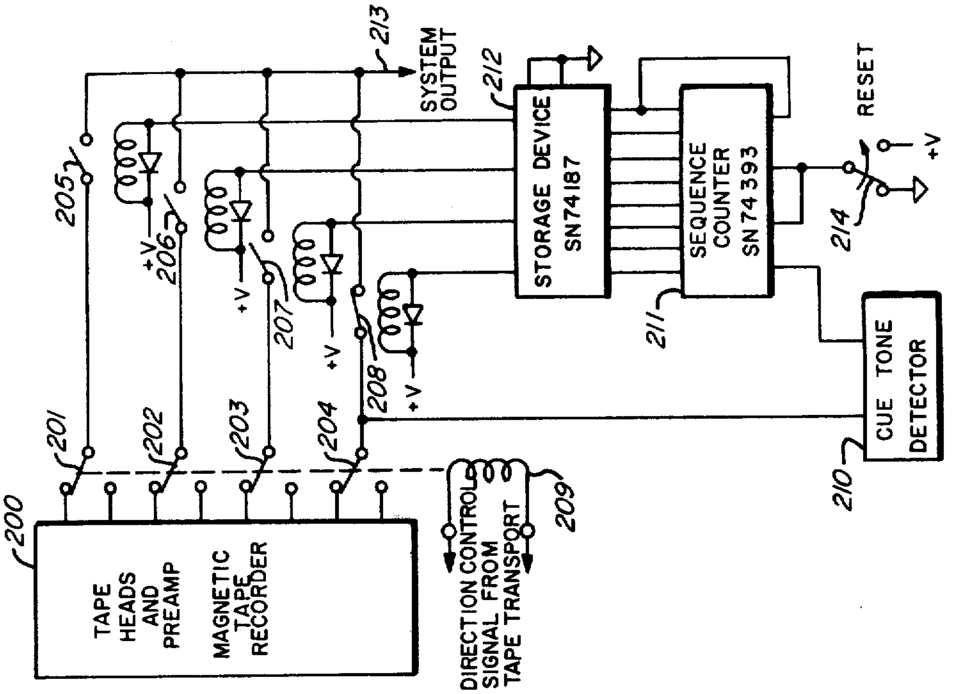
FIG. 6 shows in somewhat more detail a system according to the concepts of the system of FIG. 5.

Referring now to FIG. 6, a system according to the concepts of FIG. 5 is illustrated in somewhat more circuit detail. In the system of FIG. 6 a 256 length programmable sequence utilizing a Texas Instruments binary counter Type SN74393 is used to sequence through 256 states and provide addressing to a PROM of Texas Instruments Type 74187 corresponding to the storage device 124 of FIG. 5. In the system of FIG. 6, tape channel outputs 200 are connected via direction control output relay contacts 201, 202, 203 and 204 under the control of direction control signal relay coil 209 to four system output switches 205, 206, 207 and 208. The system output switches are controlled by the contents of the PROM 212 and may, for example, comprise Magnecraft Type W171DIP-7 relays utilized with clamping diodes as illustrated in FIG. 6. At the end of each selection recorded according to the tape format previously described, the cue at the end of the selection is detected by a conventional cue detector circuit 210 which supplies an incremental output signal to the sequence counter 211 in the manner previously discussed. Binary counter 211 provides address information to the PROM or storage device 212 causing a new bit pattern to appear on the output lines from the PROM. This bit pattern selects any one of system output switches 205–208 for connection to the system output line 213.

In the system of FIG. 6, if the magnetic tape containing the musical selection contains 256 aligned program breakpoints, then the sequence will repeat in a predetermined pattern that contains 256 songs. Similarly, if the tape contains an integer multiple or sub-multiple of 256 songs, fixed, well defined and predictable short patterns can be produced. If no common factor exists between the sequence length and the number of aligned program breakpoints, then the pattern will be very long and can appear to be somewhat random to the casual listener. However, the pattern is still predetermined whenever the counter is reset via the reset switch 214 and the tape started. If a specific predetermined sequence is created that is not easily recognized by the listener because of the length of the sequence, the same effect can be obtained as with the previously discussed, apparently random selection mechanisms.

It will be appreciated by those skilled in the art that different sequences may be obtained by resetting the counter 211 to different initial values. Thus, if it is desired to use presettable counter such as the Texas Instruments Type SN74177, an even wider variety of predetermined sequences can be generated.

It will be appreciated by those skilled in the art that if desired, the sequence counter 211 and the PROM 212 could be replaced by a punched paper tape and tape reader mechanism. In such a system, the cue detector 210 would provide an output signal upon detection of each program breakpoint cue which would advance the paper tape one reading position. If an endless belt type paper tape were used, thus any desired predetermined sequence could be programmed into the punched paper tape by the pattern of punches appearing on the tape.

Another variation of the invention would be to use an arrangement comprising multiple switches as the basis of the storage device. Thus, the pattern could be quickly and easily modified by the user simply by changing the switch positions.

A uni-directional open reel transport could be used in place of the bi-directional transport described to simplify the system but would have an undesirable period of silence while the tape was being rewound, unless some other program source were used during this time. A commercially available transport of this type is the Telex model 230. It would have a rewind and restart time of approximately one to three minutes depending on the amount of tape to be rewound. This rewind period would also be present in some cassette and cartridge players.

It will be appreciated by those skilled in the art that a programmable selection system as illustrated in FIGS. 5 and 6 could, if desired, be converted to an apparently random selection system as previously discussed merely by the elimination of the sequence counter and storage device components of the system if desired. This could be accomplished, for example, merely by the employment of switches to switch these components out of the system and by then switching in a randomly varying oscillator component as discussed with respect to the earlier figures. Thus, it could be designed to have both features employed in a single sound reproduction system with switch selection of either apparently random program selection or predetermined pattern program selection. Such a system would be contemplated to be within the true spirit and scope of the invention.

It is thus seen that many variations on the basic concepts of the present invention could be made without departing from these concepts. Accordingly, it is the aim in the appended claims to cover all such changes and modifications as would be apparent to one skilled in the art.

I claim:

1. Apparatus for producing programmable selections of music, comprising:

a prerecorded media having a plurality of channels recorded thereon and having program breakpoint alignment;

means for detecting and reproducing musical selections recorded in each of said plurality of channels and having multiple output capability;

means for providing motion of said media past said detecting means said motion providing means being dynamically operable at essentially only a single preselected speed of motion;

a plurality of gating means connected to said detecting and reproducing means for selecting a channel for output, said gating means being responsive to a selection signal;

cue detecting means for detecting a cueing condition and for generating an output signal in response thereto; and selection signal generating means including a programmable memory means having a predetermined number of memory locations, said locations having contents at least equal to the number of said plurality of channels, so as to generate a selection signal upon receipt of said output signal from said cue detecting means and for supplying said selection signal to said gating means; said locations having contents at least equal to the number of said plurality of channels, so as to generate whereby said programmable memory means selects for output one of said plurality of channels.

2. The apparatus of claim 1 wherein said selection signal generating means includes a counting register having a number of states equal to the number of said programmable memory means memory locations.

3. The apparatus of claim 1 wherein said cue detecting means comprises means for detecting simultaneous silence on each of said prerecorded channels.

4. The apparatus of claim 1 wherein said cue detecting means comprises means for detecting silence on one or more of said prerecorded channels.

5. The apparatus of claim 1 wherein said cue detecting means comprises means for detecting an inaudible cue tone.

6. The apparatus of claim 1 wherein said means for providing media motion comprises means for providing motion of an endless loop of record media past said detecting means.

7. The apparatus of claim 1 wherein said means for providing media motion comprises an open reel tape transport.

8. A method for producing programmable selections of music for continuous play on a recording and reproducing system without the requirement of human intervention for long periods of time, comprising the steps of:

(a) prerecording a recording medium according to a predetermined positional format having a plurality of channels and having in corresponding portions of each channel, recorded sets of musical selections of approximately the same duration playback time and having after each set of selections a preselected cue provided for each set of selections;

(b) detecting and reproducing the prerecorded musical selections at essentially only a single preselected speed of motion and supplying an output corresponding to a given channel as determined by a separate gating means which is responsive to a programmable selection signal;

(c) detecting said preselected cue and generating in response thereto a programmable selection signal selected from a preprogrammed memory means having a predetermined number of memory locations, said location having contents at least equal to the number of said plurality of channels, so as to generate said selection signal to said gating means, thereby providing a programmable selection of the next musical selection to be played; and (d) repeating steps (b) and (c) for any desired number of repetitions. number of repetitions.

9. The method of claim 8 wherein the step of generating a programmable selection signal comprises generating an integer number between preselected limits.

10. The method of claim 9 wherein the step of generating said integer number comprises generating a binary number between preselected limits.

11. The method of claim 9 wherein the step of generating said number is performed by supplying a sequencing signal responsive to the detection of a cue signal to a counting register having a number of states equal to the number of locations of a memory device.

12. The method of claim 11 wherein said preselected cues comprise periods of silence in each channel at the end of each recorded musical selection.

13. The method of claim 11 wherein said cues comprise periods of silence in one or more channels at the end of each set of recorded musical selections.

14. The method of claim 11 wherein said cues comprise an inaudible cue tone.

* * * * *